United States Patent
Luo

(10) Patent No.: US 8,449,122 B2
(45) Date of Patent: May 28, 2013

(54) IMAGE MARKING METHOD AND APPARATUS

(75) Inventor: Jia Luo, Beijing (CN)

(73) Assignee: IGRS Engineering Lab Ltd., Beijing (CN)

( * ) Notice: Subject to any disclaimer, the term of this patent is extended or adjusted under 35 U.S.C. 154(b) by 616 days.

(21) Appl. No.: 12/505,539

(22) Filed: Jul. 20, 2009

(65) Prior Publication Data

US 2011/0012925 A1   Jan. 20, 2011

(51) Int. Cl.
*G03B 21/00* (2006.01)

(52) U.S. Cl.
USPC ............ 353/70; 353/30; 353/31; 353/40; 353/42; 353/69; 353/98; 353/99; 353/122; 345/156; 345/157

(58) Field of Classification Search
USPC ........... 353/30, 31, 40, 42, 69, 70, 71, 98, 353/99, 122; 345/156, 157, 158, 169, 87, 345/127, 131, 173, 180, 207; 348/14.01, 348/14.03
See application file for complete search history.

(56) References Cited

U.S. PATENT DOCUMENTS

| | | | | |
|---|---|---|---|---|
| 6,802,611 | B2 * | 10/2004 | Chu et al. | 353/28 |
| 7,176,881 | B2 * | 2/2007 | Nishimura et al. | 345/156 |
| 7,306,341 | B2 * | 12/2007 | Chang | 353/94 |
| 7,559,656 | B2 * | 7/2009 | Yumiki et al. | 353/42 |
| 7,762,672 | B2 * | 7/2010 | Yokoyama et al. | 353/42 |
| 2002/0050985 | A1 * | 5/2002 | Takekawa et al. | 345/173 |
| 2005/0162398 | A1 * | 7/2005 | Eliasson et al. | 345/173 |
| 2005/0270494 | A1 * | 12/2005 | Banning | 353/42 |
| 2008/0279453 | A1 * | 11/2008 | Candelore | 382/176 |
| 2009/0091714 | A1 * | 4/2009 | Aufranc et al. | 353/70 |

FOREIGN PATENT DOCUMENTS

| | | |
|---|---|---|
| JP | 07-129322 A | 5/1995 |
| JP | 2000-056925 A | 2/2000 |
| JP | 2004-076682 A | 3/2001 |
| JP | 2001-109577 A | 4/2001 |
| JP | 2008-027080 A | 2/2008 |

\* cited by examiner

*Primary Examiner* — Georgia Y Epps
*Assistant Examiner* — Sultan Chowdhury
(74) *Attorney, Agent, or Firm* — Ren-Sheng International

(57) ABSTRACT

In accordance with embodiments of the present disclosure, a method for marking an image projected onto a surface includes capturing a second image from the surface, detecting the existence of a marking point in the second image, and modifying the first image by placing a graphic element at a location corresponding to a location of the marking point in the second image.

20 Claims, 5 Drawing Sheets

IMAGE MARKING METHOD AND APPARATUS

BACKGROUND

Unless otherwise indicated herein, the approaches described in this section are not prior art to the claims in this application and are not admitted to be prior art by inclusion in this section.

Projecting images onto a screen is broadly used for presentation purposes and the like. During a presentation, a presenter may "electronically write", or mark, on the projected image to emphasize on a particular point or make notes for future reference. For example, when a Microsoft® PowerPoint® presentation is projected onto a screen, the presenter may directly mark on one of the presentation slides by using the PowerPoint editing functions. The updated slide, which contains the presenter's inputs, can then be projected onto the screen.

Alternatively, the presenter may rely on a screen (e.g., a white board) capable of electronically capturing his/her writings and drawings. Such a screen may be equipped with physical-contact sensors or light sensors, and the screen can be configured to capture and display the presenter inputs. For example, suppose the screen can detect physical contact. During presentation, the presenter can use a hard object to press against the screen. The signal generated by the pressing is then captured by the screen and utilized for making marks on the image to be displayed.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

SUMMARY

Figure 1:
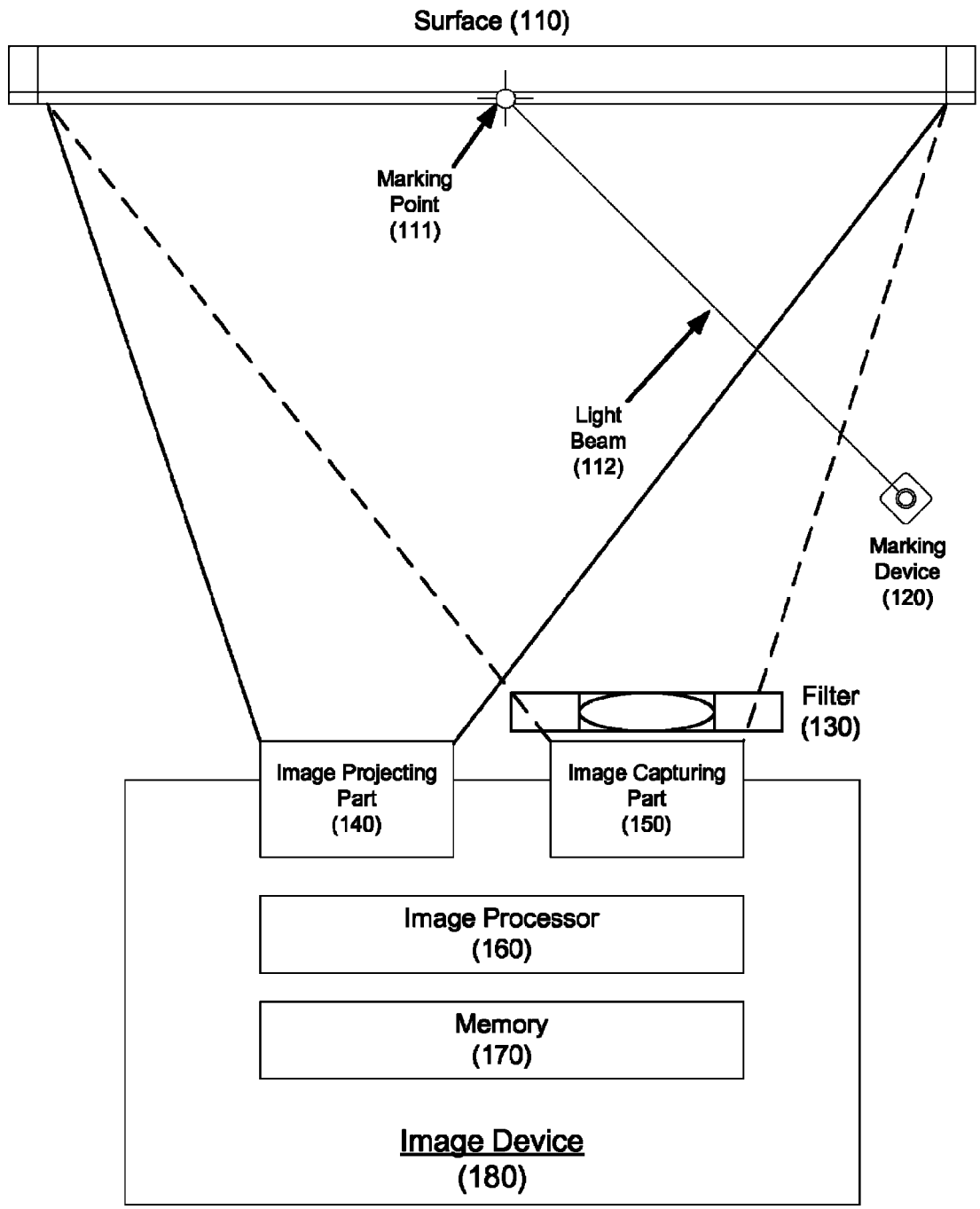
FIG. 1 is a block diagram illustrating an example image device configured to capture marking points on an image.

In accordance with one embodiment of the present disclosure, a method for marking an image projected onto a surface includes capturing a second image from the surface, detecting the existence of a marking point in the second image, and modifying the first image by placing a graphic element at a location corresponding to a location of the marking point in the second image.

In accordance with another embodiment of the present disclosure, a method for marking a first image projected onto a surface includes capturing a second image from the surface, detecting a marking point in the second image, determining a location of the marking point in the second image, modifying the first image to generate a third image by placing a graphic element at a location corresponding to a location of the marking point in the second image, and projecting the third image to the surface to replace the first image.

In accordance with a further embodiment of the present disclosure, a system configured to mark an image includes an image projecting part configured to project a first image to a surface, an image capturing part configured to capture a second image from the surface, and an image processor coupled with the image projecting part and the image capturing part. The image processor is configured to detect a marking point in the second image and to modify the first image to generate a third image by adding a graphic element at a location corresponding to a location of the marking point in the second image.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs and systems related to marking on an image. Throughout the disclosure, the term "marking device" broadly refers to a device capable of highlighting an area of interest in an image or causing the area of interest to be marked. The term "marking point" broadly refers to a position in an image identified by a marking device that is to be marked. "Marking" an image generally refers to modifying the image to include a graphic element (e.g., line, character symbol, and others) in a designated area of the image. The graphic element may have various degrees of transparency when placed over the designated area of the image.

An image device having a projecting part can project a first image to a surface for purposes such as, without limitation, presentation. With an image capturing part of the image device configured to capture a second image from the surface, the light emitted from a marking device may be captured by the image device as a marking point. In some implementations, the marking point may correspond to a point on the surface, from which the light emitted from the marking device is or appears to be reflected. In other implementations, the marking point may correspond to a point on the surface that a pen-like marking device presses against. The captured second image may be processed to detect the existence of the marking point and the location of the marking point in the second image.

After having ascertained the existence and the location of the marking point, the image device can modify the first image by placing a graphic element at a location in the first image, which corresponds to the location of the detected marking point in the second image. In one implementation, the modified first image is then projected to the surface to replace the original first image. In other words, this process allows the marking device to potentially leave marks on the first image. Moreover, by repeating the process of capturing marking points and modifying the first image, the image device allows writings and drawings to be marked on the first image.

FIG. 1 is a block diagram illustrating an example image device configured to capture marking points on an image, in accordance with at least some embodiments of the present disclosure. The image device 180 includes, among other things, an image processor 160, and a memory 170, which may be internal or external to the image device 180. The image device 180 may include an image projecting part 140, an image capturing part 150, and optionally a filter 130. The image processor 160 controls the operation of the image device 180 and may direct the image projecting part 140 to project a first image to the surface 110. When the image device 180 is in a marking mode, the image processor 160 may also instruct the image capturing part 150 to capture a second image from the surface 110 and process the captured second image to detect a marking point contained therein. Based on the detected marking point, the image processor 160 may also utilize the memory 170 to mark the first image and project the marked first image to the surface 110.

With the image device 180 in the marking mode and with the captured second image, the image processor 160 in one implementation may proceed to determine the location of the marking point in the second image and modify the first image by placing a graphic element at a location corresponding to the location of the detected marking point in the second image. Then, the image processor 160 may instruct the image projecting part 140 to project the modified first image to the surface 110.

The image device 180 may be placed in the marking mode in a number of ways. For example, in response to receiving a request to mark via a wired or wireless connection, the image device 180 may switch to the marking mode. Alternatively, the image device 180 may search for certain light characteristics (e.g., a light in a certain light spectrum). When the characteristics are detected, the image device 180 may switch to the marking mode. The marking mode may also be switched off in a similar manner. For example, the image device 180 may receive a request to switch off its marking mode. Alternatively, the image device 180 may switch off its marking mode when the light characteristics are not detected for a period of time. In the non-marking mode, the image device 180 may be configured to simply project unaltered images.

In one implementation, the image projecting part 140 is configured to project an image to an area of the surface 110. Such an area is referred to as a "projecting field." The image projecting part 140 may include additional hardware components and/or software functions to adjust the projecting field. For example, the image projecting part 140 may be configured to increase/decrease the size of the projecting field, move the projecting field to a different location on the surface, and/or adjust the color, contrast, and focus of the image being projected.

In one implementation, the image capturing part 150 is configured to capture images and/or videos from the surface 110. One example of the image capturing part 150 may be a camera with a lens, a charged-coupled device (CCD), or a complementary metal oxide semiconductor (CMOS) sensor. The image capturing part 150 may also be a camcorder adapted for capturing, processing, and storing videos. The captured image and/or video data may then be sent to the image processor 160 for further processing. The image capturing part 150 has a "viewing field", representing an area on the surface 110 that can be viewed and captured from the perspective of the image capturing part 150. The viewing field may also be similarly adjusted as the projecting field of the image projecting part 140. In one implementation, the viewing field and the projecting field may be aligned through a calibration process. The calibration process ensures that a projected image projected by the projecting part 140 and a captured image captured by the capturing part 150 can be meaningfully compared and/or processed to detect marking points.

In one implementation, the surface 110 is a surface for displaying images or videos projected from the image projecting part 140. The surface 110 may be a surface having proper roughness and color so that a light projected onto it can be appropriately reflected in certain viewing directions. In one example, the surface 110 may be a projecting screen designed to allow an image, being projected from one side, to be viewable from one or both sides of the screen. In other examples, the surface 110 may be an uneven, curvy, and/or non-flat surface, such as, without limitation, a section of a white wall in a room, a floor, a ceiling, an outside wall of a building, or a reflective liquid surface. Further, the surface 110 is not required to be equipped or coupled with any type of electronic or light sensors.

In one implementation, the marking device 120 may emit a light beam 112 (e.g., infrared light, laser, or other spectrums of light) towards the surface 110. When the light beam 112 hits the surface 110, the light may be reflected in one or more directions and may be captured by the image capturing part 150. When the image device 180 is in the marking mode, the point from which the light is reflected and captured is considered a marking point. When the light beam 112 is moved from a first location to a second location on the surface 110, the marking point is also considered to have moved from the first place to the second place.

The marking device 120 may emit a light that is in a human-visible spectrum or a human-invisible spectrum. When the light is in the human-invisible spectrum (e.g., infrared light) and the marking mode is enabled, the image device 180 may utilize its marking-point detecting function to detect the location of the invisible marking point on the surface 110 and utilize its image-modification function to place a graphic element on the image to be projected. As a result, the projected graphic element in effect turns the human-invisible marking point into a visible one.

On the other hand, when the marking device 120 emits a human-visible and image-device-detectible light beam, the marking device 120 may be used as a laser pointer. In one implementation, with a press of a button sending a signal to the image device 180 to switch on the marking mode, the image device 180 may start marking of the image to be projected based on the movement of the light beam. The details of marking an image are further described below.

In one implementation, a light filter 130 may be installed in front of the image capturing part 150 to filter out and/or allow in certain spectrums of light emitted from the marking device 120. For example, if the marking device 120 utilizes infrared light for marking a projected image, then the light filter 130 may be configured to allow infrared light emitted from the marking device 120 to be passed through the light filter 130 and to be captured by the image capturing part 150. Thus, the light filter 130 may simplify the detecting of marking points by evaluating whether there is any light with sufficient intensity. If there is no substantial amount of light passing through, then no marking point may be present. On the other hand, if the light passing through the light filter 130 comes mostly from a certain location and with sufficient intensity, then a marking point may be present.

According to one embodiment of the present disclosure, the image projecting part 140 and the image capturing part 150 can be integrated into the image device 180. The image device 180 can be implemented as a portable device such as a mobile phone, a personal data assistant (PDA), a personal media player device, a wireless web-watch device, a personal headset device, an application specific device, or a hybrid device that include any of the above functions. The image device 180 can be implemented as a personal computer including both laptop computer and non-laptop computer configurations, or as an image projector. The image device 180 can also be implemented to project high intensity light and display/capture images in a relatively bright environment. In one alternative embodiment, the image projecting part 140 and/or the image capturing part 150 may be external to the image device 180. In this case, these external image projecting and image capturing devices may be coupled with the image device 180 to perform the similar functions as discussed above. In yet another alternative embodiment, the image projecting part 140 and the image capturing part 150 may be a single component that is capable of projecting and capturing images.

Figure 2:
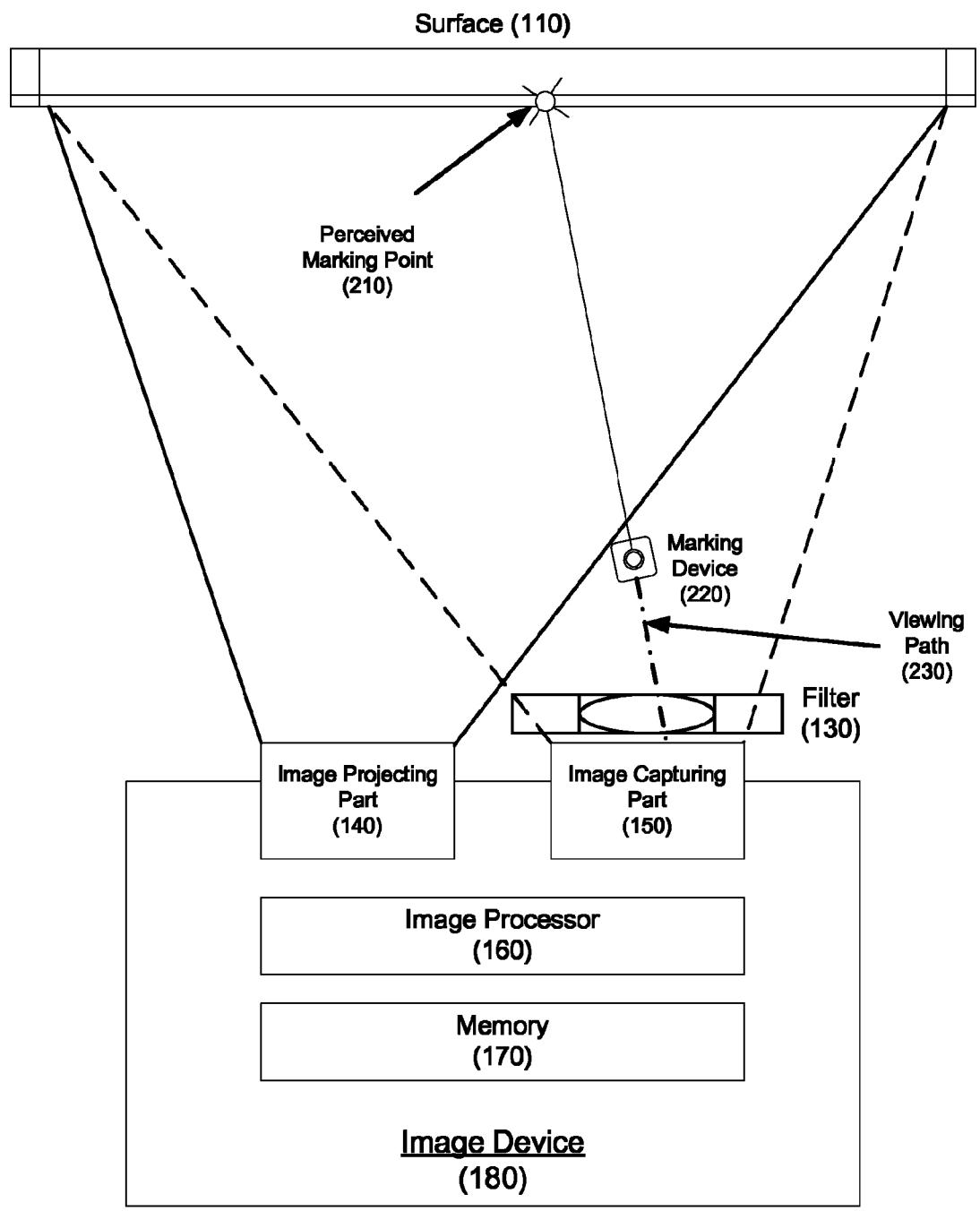
FIG. 2 is a block diagram illustrating a second example image device configured to capture marking points on an image.

FIG. 2 is a block diagram illustrating a second example image device configured to capture marking points on an image, in accordance with at least some embodiments of the present disclosure. The surface 110 and the image device 180 of FIG. 2 are similar to the ones illustrated in FIG. 1. In FIG. 2, the marking device 220 utilizes a different approach in causing marking points to be generated. Instead of emitting a light beam, the marking device 220 of FIG. 2 includes a light source that emits light in all directions. In operation, the marking device 220 may be placed between the surface 110 and the image device 180. For example, the marking device 220 may be held in front of the image capturing part 150. The placement of the marking device 220 may also be adjusted to avoid blocking the image projected from the image projecting part 140.

In one scenario, when the marking device 220 is placed in front of the image capturing part 150, the light emitted from the marking device 220 may be perceived as if the light were reflected from the surface 110 from the viewing field of the image capturing part 150. In other words, by viewing along a viewing path 230, the light from the marking device 220 appears the same as if light is reflected from a location on the surface 110, such as the location of a marking point 210. The image captured by the image capturing part 150 would still contain this marking point 210. Moreover, the marking device 220, which is positioned between the image projecting part 140 and the surface 110, may block light emitted from the image projecting part 140 and leave a shadow on the surface 110. The shadow of the marking device 220 may be used to calibrate the placement of the marking point 210, before the light source of the marking device 220 is turned on. For example, a pen-shape marking device 220 may leave a pen-shape shadow on the surface 110. Thus, if the light source is on the tip of the marking device 220, by adjusting the marking device 220 in front of the image projecting part 140, the shadow tip of the marking device 220 may be placed at the intended marking point 210. Once the marking device 220 is turned on, the light emitted from the tip of the marking device 220 would be perceived as if the light were originated from the marking point 210. In one implementation, the turning on of the marking device 220 may cause the marking mode of the image device 180 to be switched on.

In another scenario, the marking device 220 may be a pen like device and may be pressed against the surface 110. The pressing of the tip of the marking device 220 against the surface 110 may turn on the light-emitting function of the marking device 220. Since the tip of the marking device 220 emits light in all directions and is in physical contact with the surface 110, the point of physical contact becomes the marking point 210 from the perspective of the image capturing part 150. In other words, as long as the tip of the marking device 220 is pressed against the surface 110, the marking device 220 may be used as a pen for writing and drawing, and the movement of the marking device 220 is captured as a set of marking points 210.

Figure 3:
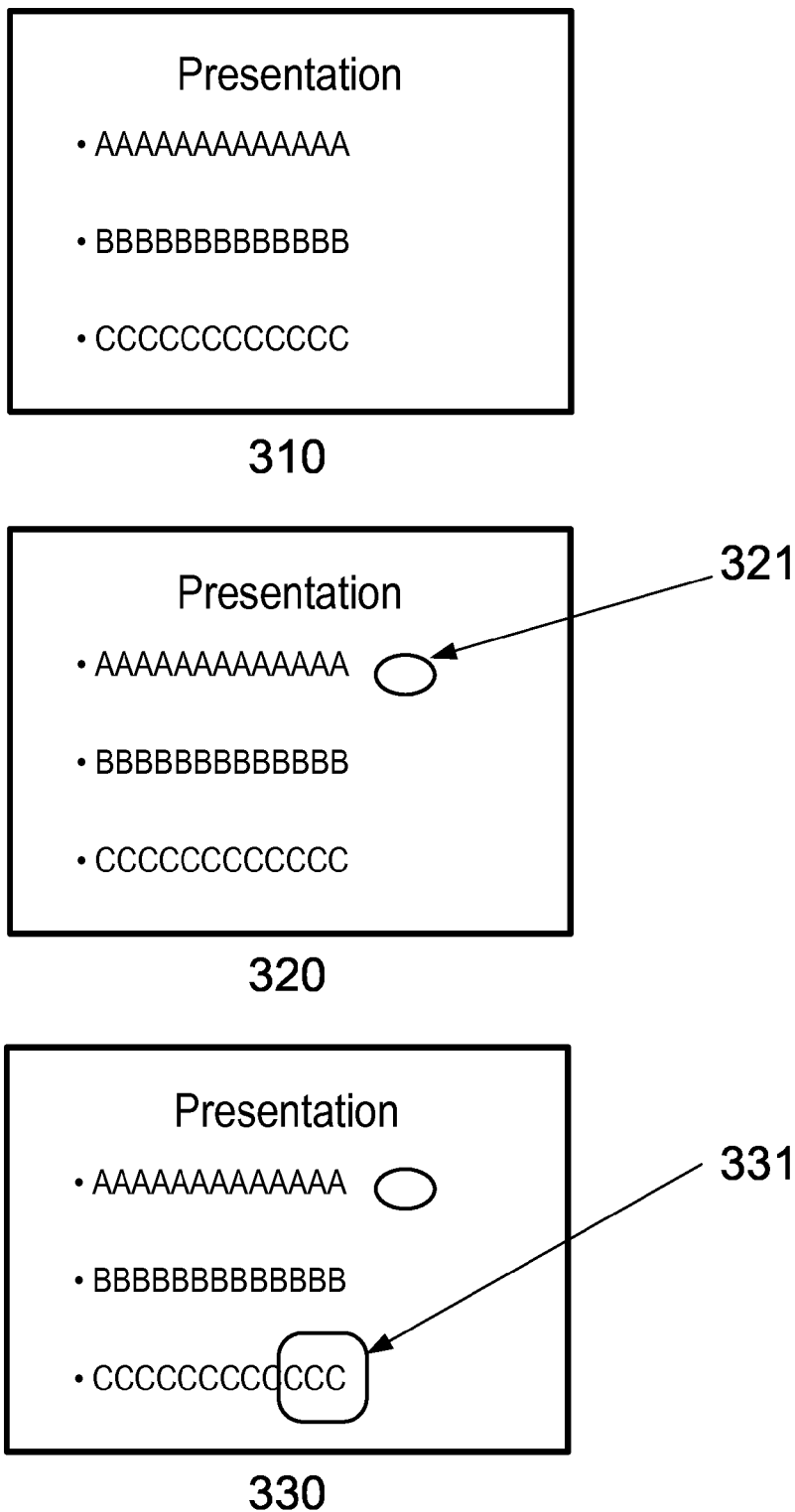
FIG. 3 illustrates an operational scenario in utilizing a marking device to place marking points on a projected image.

FIG. 3 illustrates an operational scenario in utilizing a marking device to place marking points on a projected image, in accordance with at least some embodiments of the present disclosure. In FIG. 3, a first presentational slide 310 is generated and projected by an image device to a surface. After placing marking points on the first presentation slide 310 with a marking device, the image device is configured to detect the marking points, generate a second presentation slide 320, and project the second presentation slide 320 to the surface to replace the first presentation slide 310. When additional marking points are placed on the second presentation slide 320, a third presentational slide 330 can be similarly generated.

To further illustrate, suppose a marking device adapted for utilizing one of the various approaches described above to draw an ellipse 321 on the first presentation slide 310. The image device can record the drawing of the ellipse 321 by repeatedly capturing an image of the surface and processing the captured image. Each of the captured images is processed to detect the existence and the location of a single marking point. The detected marking point is used to modify the image being projected. After modification, the modified image is then projected to the surface, and the image device is configured to capture another image for the detecting of another marking point. Thus, the marking points detected from the repeatedly captured images are accumulated and included in an image to be projected. For example, comparing to the first presentation slide 310, the second presentation slide 320 includes a graphical ellipse 321 at a location based on the marking points detected in the captured images. Other graphic elements such as, without limitation, lines, circles, and boxes, may be formulated by accumulating multiple detected marking points.

Similarly, the image device may be configured to record or capture the process of drawing a box 331 on the second presentation slide 320 by capturing multiple images of the surface within a time interval and detecting the marking points from the multiple captured images. Based on the detected marking points, the image device may generate the box 331 and modify the second presentation slide 320 to include the box 331 before projecting the modified presentation slide, or the presentation slide 330.

Figure 4:
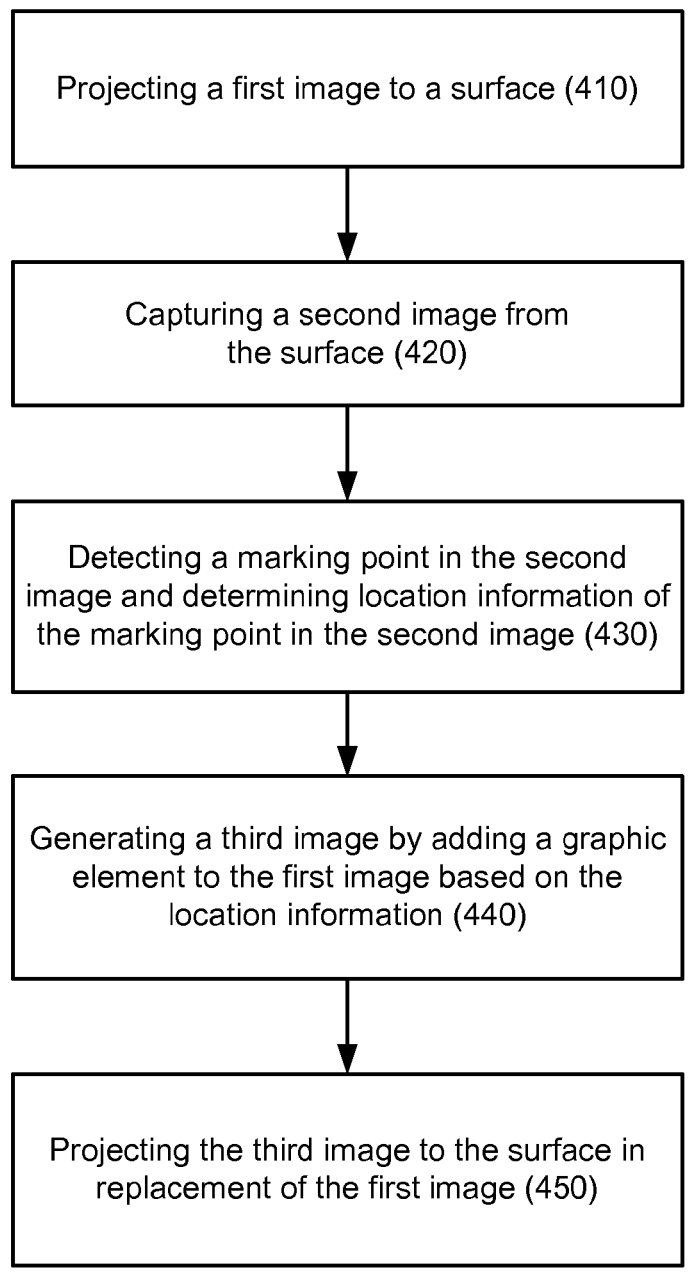
FIG. 4 is a flow diagram of an example process for capturing and displaying marks on a projected image.

FIG. 4 illustrates a flow diagram of an example process 401 for capturing and displaying marks on a projected image, in accordance with at least some embodiments of the present disclosure. The process 401 may be performed by processing logic that may comprise hardware (e.g., special-purpose circuitry, dedicated hardware logic, programmable hardware logic, etc.), software (such as instructions that can be executed on a processing device), firmware or a combination thereof. In one embodiment, machine-executable instructions for the process 401 may be stored in memory 170 of FIG. 1, executed by the processor 160 of FIG. 1, and/or implemented in an image device 180 of FIG. 1.

In one embodiment, an image device performs functions of the process 401 by projecting a first image to a surface, capturing a second image from the reflective image, detecting a marking point in the second image and determining location information of the marking point, generating a third image by adding a graphic element to the first image based on the location information, and projecting the third image to the surface in replacement of the first image.

At operation 410, an image device generates a first image and projects the first image to a surface. An image processor of the image device may generate the first image and transmit the generated image to an image projecting part of the image device. The image projecting part then may project the first image to the surface. All pixels of the first image may be in white, resulting in a white board being displayed on the surface. In one implementation, a marking device is configured to place marking points on the first image. The marking device may also signal the image device to start capturing images from the surface to detect light emitted from the marking device.

At operation 420, a second image, which may contain a marking point, is captured from the surface by an image capturing part of the image device. In one implementation, the image capturing part of an image device is a video capturing device. The captured video can then be forwarded to the image processor of the image device and be processed frame-by-frame, with each of the frames of the video being treated as the second image. Alternatively, the image device may sample some of the frames and treat each of the sampled frames as the second image. For example, if each second of a video contains 30 frames, the image device may select 10 out of the 30 frames in each second as the second images. Such an approach could reduce resource consumption in the image device when no marking point has been detected from the video frames for a period of time. The image device may also be configured to capture a second image for every predetermined and configurable interval (e.g., every 10 ms).

At operation 430, the image processor of the image device processes the second image captured at operation 420 and tries to detect whether a marking point is present in the second image. In one implementation, the image processor may compare the projected first image and the captured second image for differences. The differences of these two images can then be identified as the pixels that represent the light emitted from a marking device. During comparison, the respective pixels or groups of pixels from the first image and the second image are compared based on color, brightness, and other factors. Since some noises from other light sources in the projecting environment may also be captured by the image device, the above comparison may take the captured noises into consideration during comparison. For example, if a pixel from the first image is associated with a color or brightness value that is within a certain tolerance level comparing to a corresponding pixel in the second image, the two pixels may be deemed identical.

In another implementation, the marking point may be detected by evaluating the brightness of the pixels in the captured second image. For example, the captured second image may contain pixels that are either brighter or dimmer than the corresponding pixels in the projected first image. The dimmer pixels may be shadows on the surface that are resulted from blocking of the projected image by objects or human bodies. However, when a marking point is introduced into the viewing field of the image capturing part, the addition of light source increases the brightness of the pixels for the marking point. Thus, the marking point can be detected by identifying the pixels in the captured second image that are brighter than the corresponding pixels in the projected first image.

In yet another implementation, the marking point may be detected by evaluating the pixels in the captured second image, without utilizing the projected first image. For example, when a filter is installed to allow in only the light emitted from the marking device, the marking point can be easily detected by identifying the pixels in the captured second image that has a certain level of brightness. In another example, when the first image is utilized as a white board, any pixels with a non-white color would be treated as pixels for marking points.

If a marking point is detected at operation 430, then the location information of the marking point is also determined by the image processor. The location information describes where the pixels for the marking point are located in the captured image. For example, the location information can contains all the pixels that are deemed part of the marking point, as well as these pixels' address and color information. If no marking point is detected at operation 430, then the process 401 proceeds to operation 420 to capture additional images. If a marking point is detected, then process 401 proceeds to operation 440.

At operation 440, the image processor of the image device generates a third image based on the marking point and its location information in the captured second image. In one embodiment, the third image is generated by adding a graphic element to the projected first image at a location corresponding to the location of the marking point in the captured second image. For example, the image processor can modify the first image by changing the color and intensity of the pixels of the first image at the location corresponding to the location of the marking point in the second image. Also, a graphic element can be formed with pixels with different color, shape, or brightness, and can be used to replace the original pixels in the first image at a similar location. Alternatively, a predetermined symbol, such as a graphic icon, a square or round object, can be utilized as a graphic element and be placed in the third image at a similar location as the location of the marking point in the second image. To differentiate the graphic element to be displayed on the surface from the new marking point that will be generated by the marking device, the graphic element may have a different color, shape, brightness, or spectrum comparing to the marking point.

At operation 450, the third image generated at operation 440 is projected by the image device to the surface in replacement of the first image. Since the third image is generated with a graphic element being placed at a location designated by the marking point, once projected, the third image looks as if a graphic element is placed on the projected image at a particular location by the marking device. Further, the above operations can be repeated to capture a sequence of marking points, and display complicated graphic elements, such as lines, circles, and characters, on the surface. For example, when a first image contains previously generated graphic elements, and the subsequent marking process generates a second graphic element to be placed next to the previously generated graphic elements, then the resulted image contains multiple graphic elements that can form a part of a line or a circle. Alternatively, a sequence of marking points can be detected before a third image is generated with a set of graphic elements corresponding to the sequence of marking points.

In one embodiment, the movement of the marking points can be saved for further usage. When a set of marking points are detected during a predetermined period of time, this set of marking points can be evaluated to extract certain movement patterns. The movement patterns can then be used to trigger additional computer functions. For example, if a pattern of the marking points shows a circular movement at a particular location, the detected pattern can be used to trigger a specific computer operation, such as displaying a next slide of a presentation.

Figure 5:
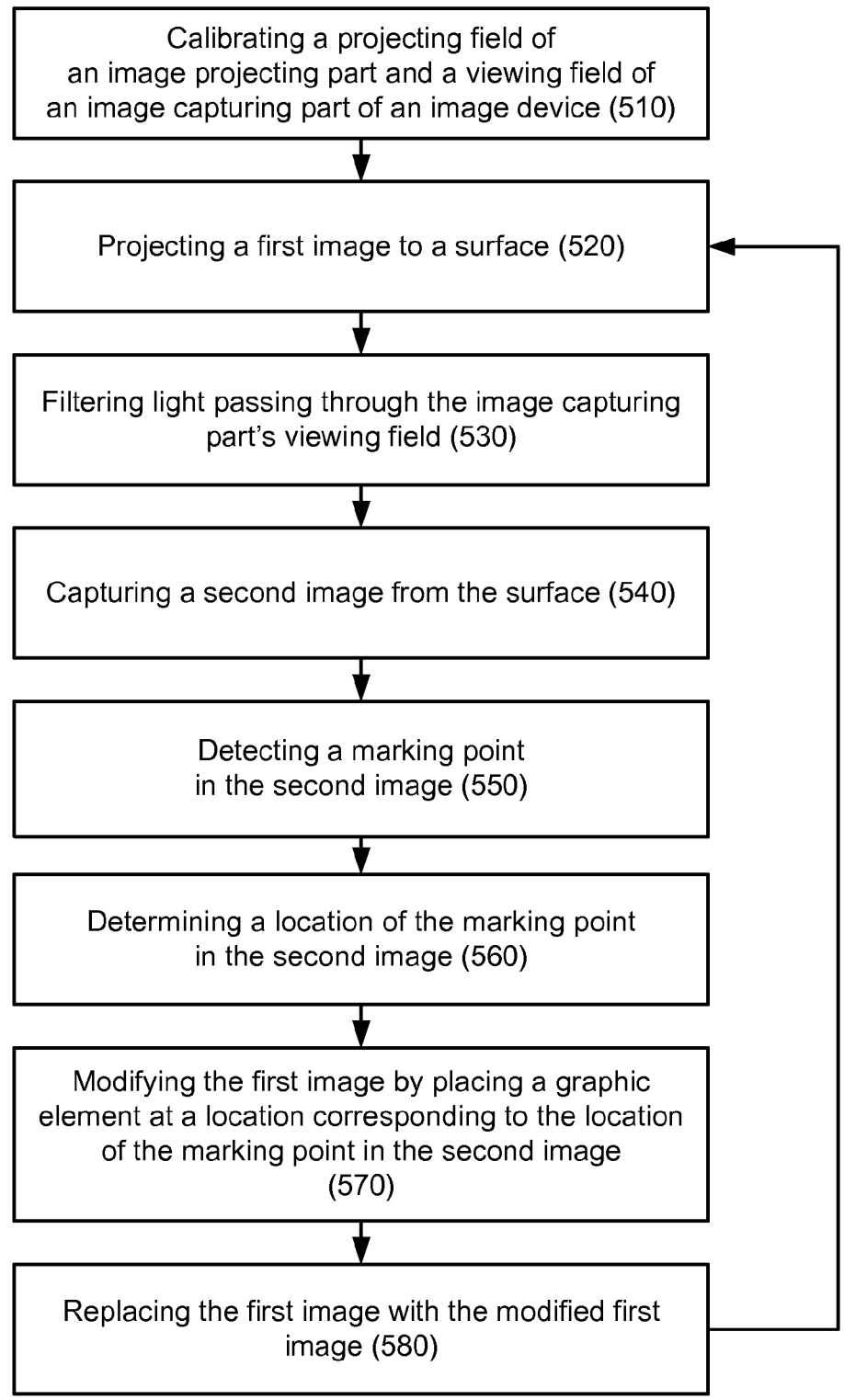
FIG. 5 is a flow diagram of an example process for calibrating, capturing and displaying marks on a projected image, all arranged in accordance with at least some embodiments of the present disclosure.

FIG. 5 illustrates a flow diagram of an example process 501 for calibrating, capturing and displaying marks on a projected image, in accordance with at least some embodiments of the present disclosure. The process 501 can be performed by processing logic that may comprise hardware (e.g., special-purpose circuitry, dedicated hardware logic, programmable hardware logic, etc.), software (such as instructions that can be executed on a processing device), firmware or a combination thereof. In one embodiment, machine-executable instructions for the process 501 can be stored in memory 170 of FIG. 1, executed by the processor 160 of FIG. 1, and/or implemented in an image device 180 of FIG. 1.

In one embodiment, an image device performs functions in the process 501 by calibrating a projecting field of an image projecting part and a viewing field of an image capturing part of the image device. After calibration, the image projecting part of the image device projects a first image to a surface. Optionally, a filter can be used in conjunction with the image capturing part to filter light passing through the image capturing part's viewing field. The image capturing part can capture a second image from the surface. The image device then detects whether a marking point exists in the second image. If the marking point exists, then the image device determines a location of the marking point in the second image, and modifies the first image by placing a graphic element at a location corresponding to the location of the marking point in the second image. Afterward, the first image is replaced with the modified image, and the process 501 can repeat the above operations starting from operation 520.

At operation 510, a calibration process can be optionally performed to align the projecting field of the image projecting part with the viewing field of the image capturing part of an image device. Aligned projecting field and viewing field reduce the amount of processing required in comparing the projected image with the captured image during marking point detection. In calibration process, the image projecting part can project a special image, which contains specific image patterns describing the boundaries of the projecting field, to the surface. The image capturing part can then capture an image from the surface, and try to detect these patterns in the captured image. For example, the projected image can contain lines marking the four corners of the projected field. Upon capturing the image through the image capturing part, the image device can ascertain these four corners of the projecting field, and adjust the viewing field accordingly in order to match the projecting field with the viewing field. The adjustment can be accomplished by physically fine-tuning the image capturing part, or by software approaches.

At operation 520, the image projecting part projects a first image to a surface similar to operation 410 of FIG. 4. At operation 530, a filter is optionally placed in front of the image projecting part. If the filter can filter out all other spectrums of light and let-in only the specific light emitted from the marking device, then the subsequent marking point detection operation can be greatly simplified. At 540, the image capturing part of the image device captures a second image from the surface similar to operation 420 of FIG. 4. The captured second image may contain marking points emitted from the marking device. At 550, the captured second image is transmitted from the image capturing part to the image processor of the image device. In operation, the marking point is detected by the image processor as described above. At 560, the location information of the marking point is also determined by the image device. At 570, based on the marking point detected at operation 550, and the location information ascertained at operation 560, the first image of operation 520 is modified by placing a graphic element at a location corresponding to the location of the marking point in the second image. At operation 580, the first image is replaced by the image device with the modified image. Afterward, process 501 can optionally proceed to operation 520, in which the modified first image, which contains the added graphic element, is projected onto the surface. Thus, process 501 can proceed to detect additional marking points.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for marking a first image projected to a surface, comprising:
    capturing, by an image capturing component of an image device, a second image from the surface;
    detecting a marking point in the second image, wherein the marking point is generated by a marking device, placed on a viewing path between the image capturing component and the surface, emitting light toward the image capturing component; and
    generating a third image by placing a graphic element in the first image at a location corresponding to a location of the marking point in the second image.

2. The method as recited in claim 1, further comprising:
    projecting the third image to the surface to replace the first image.

3. The method as recited in claim 2, further comprising:
    capturing a fourth image from the surface, on which the third image is displayed;
    detecting a second marking point in the fourth image;
    generating a fifth image by placing a second graphic element in the fourth image; and
    projecting the fifth image to the surface to replace the third image.

4. The method as recited in claim 3, wherein the first image and the third image are generated by an image projecting component of the image device, and the fourth image is captured by the image capturing component of the image device.

5. The method as recited in claim 4, further comprising:
calibrating the image device by aligning a viewing field of the image capturing component with a projecting field of the image projecting component.

6. The method as recited in claim 1, wherein the detected marking point is perceived by the image capturing component as a point reflected from the surface.

7. The method as recited in claim 1, wherein the marking device emits the light when a tip of the marking device is being pressed against the surface.

8. The method as recited in claim 1, wherein the detecting of the marking point comprising filtering the light emitted by the marking device.

9. The method as recited in claim 1, wherein the detecting of the marking point comprising finding a difference between the first image and the second image, the marking point being associated with the difference.

10. The method as recited in claim 1, wherein the detecting comprising identifying pixels in the second image that have different colors comparing to corresponding pixels in the first image.

11. The method as recited in claim 1, wherein the method is embodied in a machine-readable medium as a set of instructions which, when executed by an image processor, cause the image processor to perform the method.

12. A method for marking a first image projected to a surface, comprising:
capturing a second image from the surface;
detecting a marking point in the second image, the marking point being associated with a difference detected by comparing the first image and the second image;
determining a location of the marking point in the second image;
modifying the first image to generate a third image by placing a graphic element at a location corresponding to the location of the marking point in the second image; and
projecting the third image to the surface to replace the first image.

13. The method as recited in claim 12, wherein the graphic element is associated with a degree of transparency.

14. The method as recited in claim 12, further comprising receiving a request to enter a marking mode prior to the capturing.

15. The method as recited in claim 12, wherein the marking point is generated by a human-invisible light source.

16. A system configured to mark an image, comprising:
an image projecting component configured to project a first image to a surface;
an image capturing component configured to capture a second image from the surface; and
an image processor coupled with the image projecting component part and the image capturing component, wherein the image processor is configured to detect a marking point in the second image and to modify the first image to generate a third image by adding a graphic element at a location corresponding to a location of the marking point in the second image, the marking point being associated with a difference detected by comparing the first image and the second image.

17. The system as recited in claim 16, further comprising a filter coupled with the image capturing component to detect the marking point from the second image.

18. The system as recited in claim 16, wherein the marking point corresponds to a point on the surface that is identified by a light beam and within the boundary of the first image.

19. The system as recited in claim 16, wherein the marking point is generated by a marking device, placed on a viewing path between the image capturing component and the surface, emitting light toward the image capturing component.

20. The system as recited in claim 16, wherein the image processing component is further configured to detect the marking point by finding pixels in the second image that have different colors comparing to corresponding pixels in the first image.

* * * * *

UNITED STATES PATENT AND TRADEMARK OFFICE
CERTIFICATE OF CORRECTION

PATENT NO. : 8,449,122 B2  
APPLICATION NO. : 12/505539  
DATED : May 28, 2013  
INVENTOR(S) : Luo

Page 1 of 1

It is certified that error appears in the above-identified patent and that said Letters Patent is hereby corrected as shown below:

In the Specification

In Column 10, Line 52, delete "and or" and insert -- and/or --, therefor.

In the Claims

In Column 14, Line 16, in Claim 16, delete "component part" and insert -- component --, therefor.

Signed and Sealed this
Twenty-ninth Day of October, 2013

Teresa Stanek Rea
*Deputy Director of the United States Patent and Trademark Office*